US012723803B2

(12) United States Patent
Miedema

(10) Patent No.: US 12,723,803 B2
(45) Date of Patent: Sep. 1, 2026

(54) APPLIANCE DOOR HANDLES WITH INTEGRATED GRAPHICAL DISPLAYS

(71) Applicant: CSE, Inc., Norton Shores, MI (US)

(72) Inventor: Gregory A. Miedema, Spring Lake, MI (US)

(73) Assignee: CSE, Inc., Norton Shores, MI (US)

(*) Notice: Subject to any disclaimer, the term of this patent is extended or adjusted under 35 U.S.C. 154(b) by 197 days.

(21) Appl. No.: 18/434,030

(22) Filed: Feb. 6, 2024

(65) Prior Publication Data

US 2024/0175625 A1 May 30, 2024

Related U.S. Application Data

(63) Continuation of application No. 17/538,446, filed on Nov. 30, 2021, now Pat. No. 11,892,227, which is a (Continued)

(51) Int. Cl.
*F25D 23/02* (2006.01)
*G09G 5/00* (2006.01)

(52) U.S. Cl.
CPC ........... *F25D 23/028* (2013.01); *G09G 5/006* (2013.01); *F25D 2700/00* (2013.01); *G09G 2370/16* (2013.01)

(58) Field of Classification Search
CPC ............... F25D 23/028; F25D 2700/00; F25D 2400/36; G09G 5/006; G09G 2370/16; G09G 2330/021
See application file for complete search history.

(56) References Cited

U.S. PATENT DOCUMENTS 4,369,632 A 1/1983 Abraham
6,948,272 B1 9/2005 Olivier et al.
(Continued)

FOREIGN PATENT DOCUMENTS

CA 2454212 A1 6/2005
CN 205418771 U * 8/2016
(Continued)

OTHER PUBLICATIONS

International Search Report and Written Opinion of the International Searching Authority from corresponding Patent Cooperation Treaty (PCT) Application No. PCT/IB2019/055006, indicated completed on Nov. 6, 2019.

(Continued)

*Primary Examiner* — Kun Kai Ma
(74) *Attorney, Agent, or Firm* — Gardner, Linn, Burkhart & Ondersma LLP

(57) ABSTRACT

A graphical display device for mounting to a door of an appliance includes an electronic visual display having a display screen, a housing having a receptacle for receiving the electronic visual display and a mount for affixing the housing to the door of an appliance. The housing additionally includes an internal cavity with a controller retained within the internal cavity, with the controller being operable to selectively enable visual display information to be displayed on the display screen. In a particular embodiment the graphical display device is configured as a housing with the housing including a grip portion and one or more mounts extending rearwardly from the grip portion. The controller may include an interface enabling connection with a remote computer for controlling the visual display information to be displayed on the display screen.

18 Claims, 16 Drawing Sheets

Related U.S. Application Data continuation of application No. 16/441,476, filed on Jun. 14, 2019, now Pat. No. 11,193,709.

(60) Provisional application No. 62/805,995, filed on Feb. 15, 2019, provisional application No. 62/684,971, filed on Jun. 14, 2018.

(56) References Cited

U.S. PATENT DOCUMENTS

| | | | | |
|---|---|---|---|---|
| 7,082,777 | B2 | 8/2006 | Becke et al. | |
| D559,653 | S | 1/2008 | Reichling et al. | |
| 7,383,654 | B2 | 6/2008 | Olivier et al. | |
| 7,766,525 | B2 | 8/2010 | Rosenbauer et al. | |
| D635,161 | S | 3/2011 | Horn | |
| 8,053,935 | B2 | 11/2011 | Knight et al. | |
| 8,081,085 | B2 | 12/2011 | Jerg et al. | |
| 8,108,972 | B2 | 2/2012 | Bae et al. | |
| 8,469,532 | B2 | 6/2013 | Pae | |
| 8,544,972 | B2 | 10/2013 | Pae | |
| 8,567,885 | B2 | 10/2013 | Lee et al. | |
| D706,516 | S | 6/2014 | Caglia | |
| 8,819,971 | B2 | 9/2014 | English | |
| D717,839 | S | 11/2014 | Sin et al. | |
| 8,917,513 | B1 * | 12/2014 | Hazzard | H05K 5/0208 361/826 |
| D724,153 | S | 3/2015 | Sacks | |
| 9,032,653 | B2 | 5/2015 | English | |
| 9,189,983 | B2 | 11/2015 | English | |
| 9,196,177 | B2 | 11/2015 | English | |
| 9,574,371 | B2 | 2/2017 | English | |
| 9,626,886 | B2 | 4/2017 | Francavilla et al. | |
| 9,953,551 | B2 | 4/2018 | Best | |
| 2003/0209018 | A1 * | 11/2003 | Becke | A47B 95/02 62/126 |
| 2005/0172649 | A1 | 8/2005 | Bunch et al. | |
| 2006/0012189 | A1 | 1/2006 | Olivier et al. | |
| 2006/0026975 | A1 * | 2/2006 | Bunch | A47F 3/0478 62/154 |
| 2007/0152076 | A1 | 7/2007 | Chiang et al. | |
| 2007/0180869 | A1 | 8/2007 | Geyer | |
| 2008/0235911 | A1 | 10/2008 | Olivier et al. | |
| 2010/0308073 | A1 * | 12/2010 | Devilbiss | F25D 23/126 62/236 |
| 2011/0121660 | A1 * | 5/2011 | Azancot | H02J 50/402 307/104 |
| 2011/0224947 | A1 | 9/2011 | Kriss | |
| 2012/0105424 | A1 * | 5/2012 | Lee | G06F 3/041 345/212 |
| 2013/0174586 | A1 * | 7/2013 | Kang | F25D 29/00 62/125 |
| 2014/0144083 | A1 * | 5/2014 | Artwohl | G09F 23/065 49/70 |
| 2014/0174489 | A1 | 6/2014 | Cottrell et al. | |
| 2015/0020421 | A1 | 1/2015 | English | |
| 2016/0117022 | A1 * | 4/2016 | Kim | F24C 15/02 345/82 |
| 2016/0290713 | A1 | 10/2016 | Twiggar, III et al. | |
| 2016/0305154 | A1 | 10/2016 | English | |
| 2016/0327332 | A1 * | 11/2016 | Kim | F25D 29/005 |
| 2017/0027339 | A1 | 2/2017 | Chang et al. | |
| 2017/0046990 | A1 | 2/2017 | Cummings et al. | |
| 2017/0248925 | A1 | 8/2017 | Root | |
| 2017/0370636 | A1 | 12/2017 | Koo et al. | |
| 2018/0010846 | A1 | 1/2018 | Snyder et al. | |
| 2018/0224151 | A1 | 8/2018 | Froehlich et al. | |
| 2019/0265844 | A1 | 8/2019 | Burkert et al. | |
| 2019/0354195 | A1 | 11/2019 | Beliveau et al. | |
| 2019/0383550 | A1 | 12/2019 | Miedema | |

FOREIGN PATENT DOCUMENTS

| | | | | |
|---|---|---|---|---|
| TR | 201603416 U * | 4/2016 | | |
| WO | WO-2017041261 A1 * | 3/2017 | | F25D 29/00 |
| WO | WO-2017100897 A1 * | 6/2017 | | H04L 65/00 |
| WO | 2018092990 A2 | 5/2018 | | |

OTHER PUBLICATIONS

European Search Report from corresponding European Patent Application Serial No. 19819471.4 dated Feb. 16, 2022.

* cited by examiner

APPLIANCE DOOR HANDLES WITH INTEGRATED GRAPHICAL DISPLAYS

CROSS REFERENCE TO RELATED APPLICATIONS

The present application is a continuation of U.S. application Ser. No. 17/538,446, filed on Nov. 30, 2021, now U.S. Pat. No. 11,892,227, which is a continuation of U.S. application Ser. No. 16/441,476, filed on Jun. 14, 2019, now U.S. Pat. No. 11,193,709, which claims priority of U.S. provisional application Ser. No. 62/684,971 filed Jun. 14, 2018, and of U.S. provisional application Ser. No. 62/805,995 filed Feb. 15, 2019, which are hereby incorporated herein by reference in their entireties.

BACKGROUND AND FIELD OF THE INVENTION

The present invention is directed to display systems, and in particular, to cooler or appliance door handles with integrated display systems.

Conventional cooler or appliance doors are typically provided with handles to aid a user in opening their doors. Such handles are generally formed to aid the user in grasping the handle and opening the appliance or cooler door.

SUMMARY OF THE INVENTION

The present invention provides a graphical display device for mounting to a door of an appliance, such as mounting to a cooler door, where the graphical display device is configurable as a handle and includes an electronic visual display to provide information to consumers.

According to an aspect of the present invention, a graphical display device for mounting to a door of an appliance includes an electronic visual display having a display screen, a housing having a receptacle for receiving the electronic visual display and a mount for affixing the housing to the door of an appliance. The housing additionally includes an internal cavity with a controller retained within the internal cavity, with the controller being operable to selectively enable visual display information to be displayed on the display screen.

In a particular embodiment the graphical display device is configured as a housing with the housing including a grip portion and one or more mounts extending rearwardly from the grip portion so as to space the grip portion from the door of an appliance. The controller includes an interface enabling connection with a remote computer for controlling the visual display information to be displayed on the display screen. Still further, the receptacle and internal cavity may be disposed in the grip portion, and the grip portion may further be constructed so as to have different thickness, with the internal cavity for the controller disposed in a thicker portion of the grip. The controller may additionally include an interface, such as a wireless interface, enabling connection with a remote computer for controlling the visual display information to be displayed on the display screen.

A cooler in accordance with a further aspect of the present invention includes one or multiple doors, with each door including a graphical display device, where the graphical display device may be configured as a handle. The door may include a frame and a transparent panel, with the frame being disposed about the transparent panel, where the graphical display handle may be affixed to the frame and configured to receive power supplied to the controller of the handle display device through the frame. The controllers of each of the handles of the cooler include an interface enabling connection with a remote computer for controlling the visual display information to be displayed on the display screen of each electronic visual display. The computer may be used to control the display information of one or more coolers located in a single facility, or to control one or more coolers in each of multiple facilities.

The graphical display devices for appliance doors of the present invention enables information to be displayed to individuals using the appliances, such as to consumers in a retail facility, where the information may be readily changed or updated, thereby creating a flexible and effective marketing means for communicating with consumers. These and other objects, advantages, purposes and features of this invention will become apparent upon review of the following specification in conjunction with the drawings.

DESCRIPTION OF THE PREFERRED EMBODIMENTS

Figure 1:
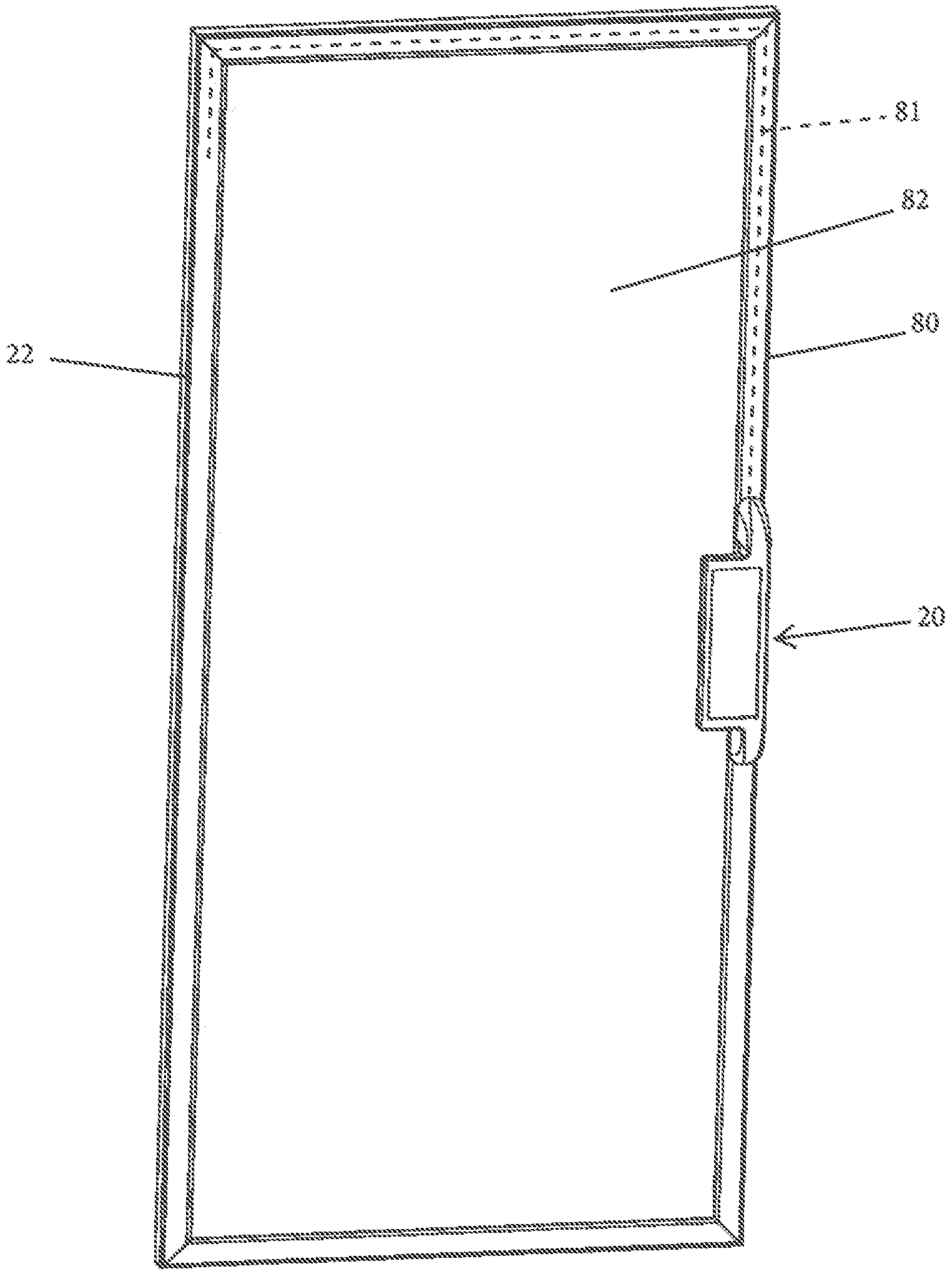
FIG. 1 is a front perspective view of an appliance door with graphical display device handle in accordance with an aspect of the present invention.

The present invention will now be described with reference to the accompanying figures, wherein the numbered elements in the following written description correspond to like-numbered elements in the figures. A graphical display device for appliances configured as a handle 20 is shown in FIG. 1 affixed to an appliance door, such as a cooler door 22 in accordance with the present invention. As understood from FIG. 1A, a facility 24, such as a retail store, may include multiple appliances, such as coolers 26, where each cooler 26 includes multiple doors 22 and with each door 22 including a handle 20. As discussed in more detail below, handles 20 include an integrated electronic visual display 30 that is configured to provide visual display information to a consumer regarding products contained within the cooler 26, with an operator of the facility 24 being able to selectively customize the displayed information, such as by way of remote interaction with the handle 20. The display information may include, for example, product names, such as "milk", "eggs", "ice cream", or may include specific product brand names or logos, including trademarks, or may include pricing, alerts such as specials or advertisements, store names or logos, nutritional information, or other types of display information informative to a consumer.

Figure 6:
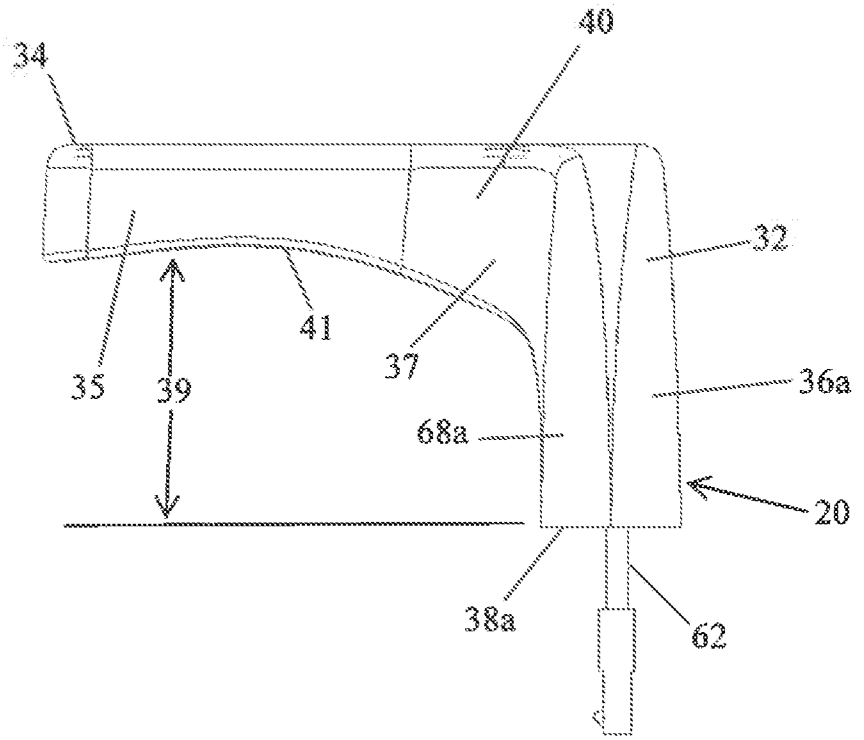
FIG. 6 is an end elevation view of the display handle of FIG. 2.
Figure 7:
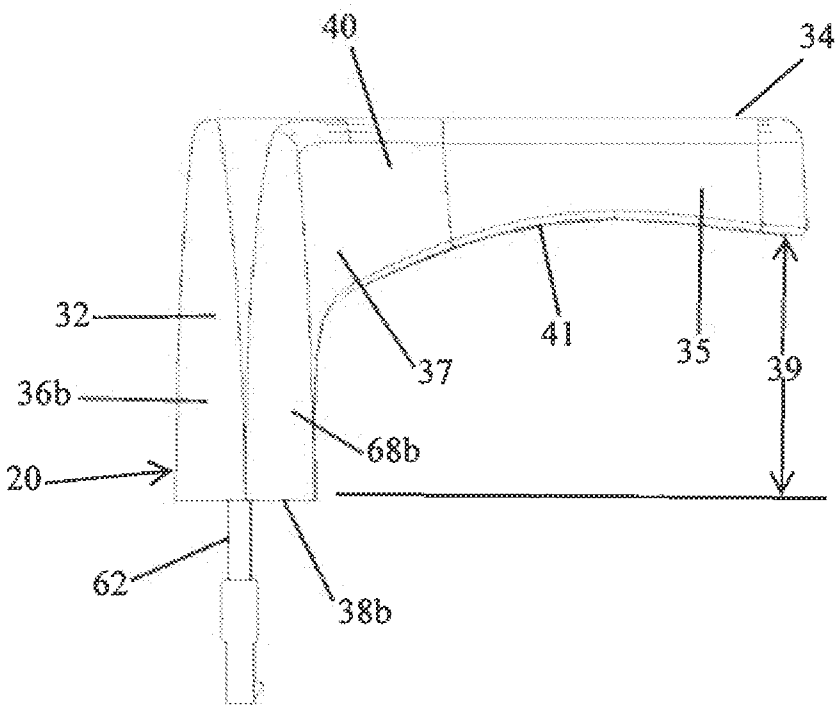
FIG. 7 is an opposite end elevation view of the display handle of FIG. 2.

Referring now to FIGS. 2-8B, in the illustrated embodiment handle 20 is shown to include a body or housing 32 that supports display 30, with housing 32 including a grasping or grip portion 34 disposed between a pair of mounts 36*a*, 36*b*. Mounts 36*a*, 36*b* extend rearwardly from gripping portion 34 whereby grip portion 34 is spaced away from a plane defined by the mounting ends 38*a*, 38*b* of mounts 36*a*, 36*b*. As shown in FIGS. 6 and 7, this spacing forms a gap 39 between the backside 41 of the grip portion 34 and the door 22 sized to enable an individual to place their fingers behind grip portion As best understood from FIGS. 8A and 8B, housing 32 includes an outer portion 40 and an inner portion 42 that are configured to be secured together in clam shell arrangement, with outer portion 40 including a cavity or receptacle 44 for receiving display 30, and with an inner cavity 46 formed between the outer and inner portions 40, 42 of housing 32. In the illustrated embodiment, inner cavity 46 extends lengthwise along one side of grip portion 34 between mounts 36*a*, 36*b*. As discussed in more detail below, inner cavity 46 retains an electronic assembly or module that includes a controller 48 used in the operation of handle 20 to display information on display 30.

As best understood with reference to FIGS. 6 and 7, grip portion 34 of housing 32 is of varying thickness, with grip portion 34 being narrower or thinner at edge portion 35 and wider or thicker at edge portion 37, where edge portion 35 extends laterally away from mounts 36*a*, 36*b* and is intended to enable an individual to place their fingers there behind to aid opening of a door 22. Moreover, edge portion 37 encompasses inner cavity 46, which provides additional room for retaining the controller 48 therein. The narrower edge portion 35 is thus disposed behind a portion of the display 30. Thus, with regard to the cross-sectional shape of housing 32, the gripping portion 34 is narrower or thinner at one portion relative to the portion of the housing 32 containing the electronic control module 48, whereby the narrower segment provides a convenient grasping portion for the fingers of an individual to open the cooler door 22. Still further, in the illustrated embodiment the narrower segment of the grip portion 34 extends the length of the handle 20 relative to the two mounts 36*a*, 36*b* used to affix the handle 20 to the cooler door 22 and space the grip portion 34 from the door 22.

Figure 8A:
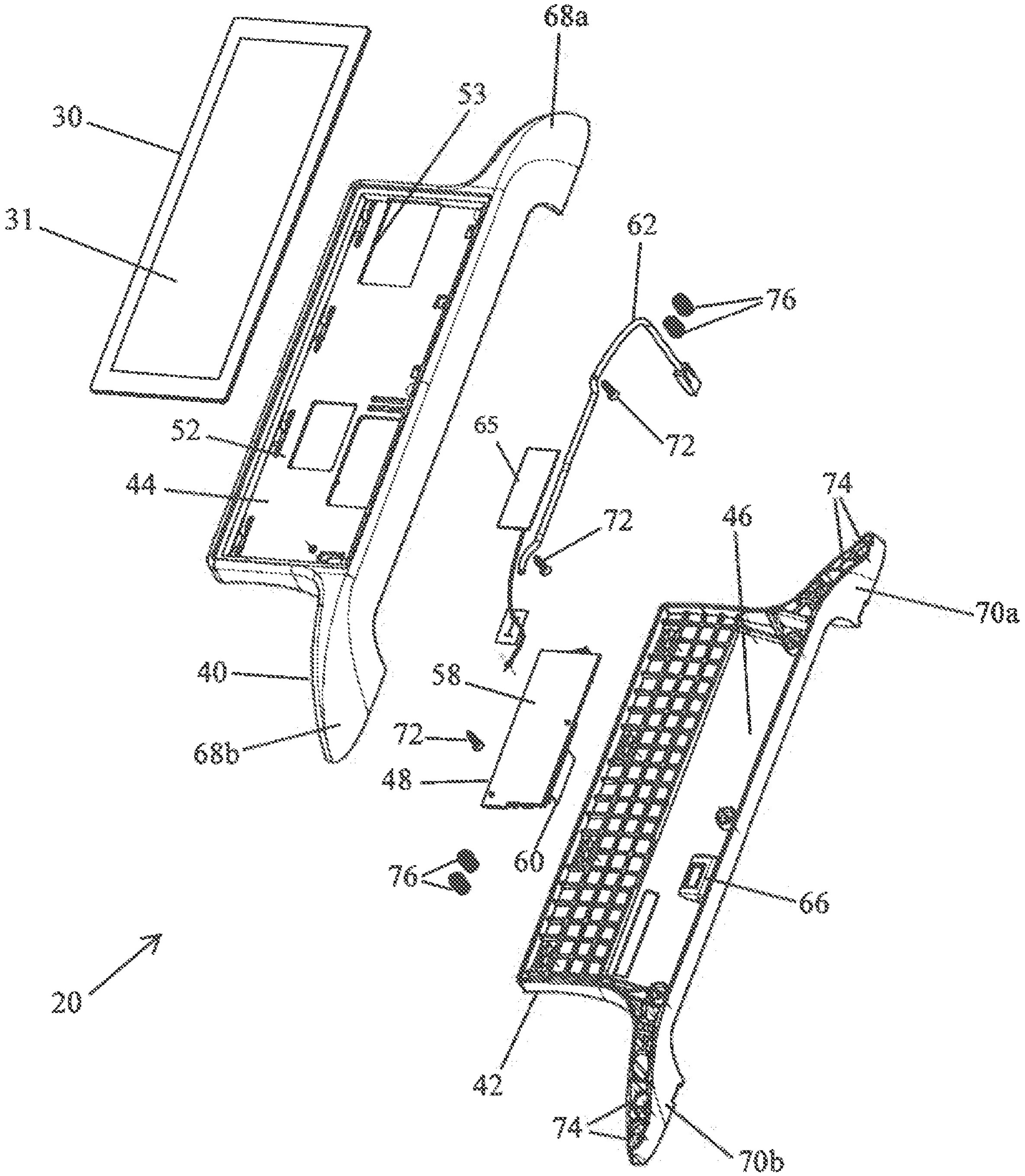
FIG. 8A is a front perspective exploded view of the display handle of FIG. 2.
Figure 8B:
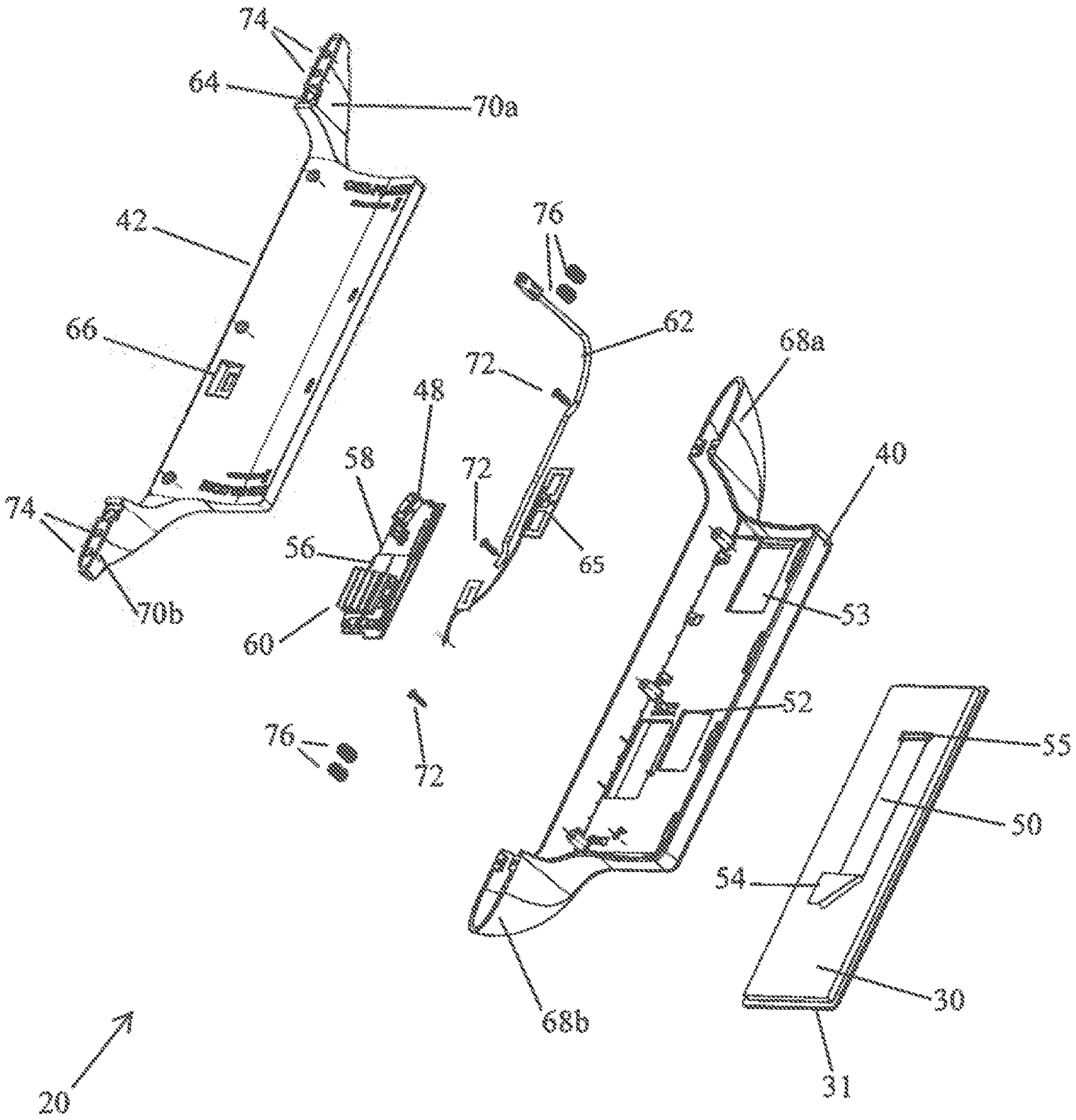
FIG. 8B is a rear perspective exploded view of the display handle of FIG. 2.

Display 30 is configured as an electronic display and includes a display screen 31, such as a liquid crystal display (LCD). Other electronic displays, however, may be employed, such as, for example, light-emitting diode (LED) displays, organic light-emitting diode (OLED) displays, active-matrix organic light-emitting diode (AMOLED) displays, or electronic paper displays (e.g., E ink-type displays). With reference to FIGS. 8A and 8B, display 30 includes a conventional ribbon cable 50 for providing display information signals to display 30, with outer portion 40 including an aperture 52 through which a connector end 54 of cable 50 is passed for connection with controller 48 and including an aperture 53 for receiving the opposite connector end 55 of cable 50. As shown in FIG. 8A, receptacle 44 includes upright walls defining a rectangular cavity within which display 30 may be nested, with display 30 being retained within receptacle 44 such as by double-sided tape, fasteners or adhesive, snaps, a retention member, or may be molded in to be encapsulated with or by housing 32.

As also understood from FIGS. 8A and 8B, controller 48 includes a central processing unit (CPU) 56 that is affixed or integrated with a carrier or input/output board 58 and a heat sink 60. A cable 62 for providing power to controller 48 and display 30 is routed within housing 32 and extends out of housing 32 through an opening 64 in mount 36*a*. In the illustrated embodiment cable 62 is disclosed as a power and data cable 62, such as an Ethernet cable, and connects with controller 48. Alternatively, however, cable 62 may just provide power with data being supplied to controller 48 via alternative or additional means. Although cable 62 is shown in the illustrated embodiment as extending out of opening 64 in mount 36*a*, it should be appreciated that mount 36*b* includes a similar opening 64 out of which cable 62 may alternatively be extended. Controller 48 further includes an interface, such as wired interface or a wireless interface, such as a wireless local area networking connectivity, for use with a computer system, as discussed below. In a wireless configuration, a wireless antennae 65 as shown in FIGS. 8A and 8B is connected with controller 48 for wireless communication, such as via WiFi or Bluetooth. Accordingly, handle 20 may receive data via the interface whereby cable 62 need not be configured as a data cable. In the illustrated embodiment controller 48 further includes a data port, such as a universal serial bus (USB) port, which is accessed through port 66 on inner portion 42. In particular embodiments, controller 48 may not be interfaced with separate computers, in which case handle 20 may be a standalone handle that may be selectively updated via port 66, such as via a memory stick, where the controller reads and displays information contained on the memory stick. Thus, as discussed in more detail below, controller 48 enables the selective controlling of display information to appear on display screen 31.

As previously noted, controller 48 is contained within inner cavity 46 when outer portion 40 and inner portion 42 of housing 32 are assembled together. Moreover, as understood from FIGS. 8A and 8B, mounts 36*a*, 36*b* are constructed or formed from legs of outer portion 40 and inner portion 42. Outer portion 40 includes legs 68*a*, 68*b* and inner portion 42 includes legs 70*a*, 70*b*, where legs 70*a*, 70*b* nest within legs 68*a*, 68*b* when outer portion 40 and inner portion 42 are joined, such as by fasteners 72 and snap-fit connectors.

Legs 70*a*, 70*b* of inner portion 42 include mounting holes 74 for use in mounting handle 20 to an appliance door 22, such as by way of fasteners 76. In particular, as understood from FIG. 1, in the illustrated embodiment handle 20 is mounted to a frame 80 of door 22, where frame 80 surrounds a transparent panel 82, such as tempered glass. Alternatively, handles in accordance with the present invention can be connected to a door 22, such as to the door frame 24 or to the transparent panel 82, via alternative mechanisms, such as via an adhesive, double-sided tape, or the like, or combinations thereof. It should be appreciated that graphical display devices in accordance with the present invention may be used on alternative appliances, including appliances having alternative door configurations. For example, the graphical display devices may be mounted to appliance doors that do not include a transparent panel, but instead are opaque. Still further, although discussed as being used on coolers in a retail facility, the graphical display devices may be used on alternative appliances, such as stoves, refrigerators, and the like, including household appliances.

Cable 62 is able to connect with a power supply via an electrical connection running within frame 80 to provide power to handle 22 via a wired power connection, such as wire 81 shown in FIG. 1, where wire 81 is connected through a hinge of door 22. Alternatively, a non-contact power connection, such as an inductive field, may be provided between the display-equipped handle 20 and a power source in the door. For example, in the case of an appliance configured as a cooler having a transparent portion, such as a glass portion 82, for seeing products therein, the outer frame 80 to which the transparent portion 82 is mounted may be equipped with an electrical supply, such as electrical wiring, for supplying power to integrated lighting in the door frame 80 and/or heating bands within the frame 80 used to remove condensation on the transparent portion 82. For example, the handle 20 is mounted to the door frame 80 and operatively connected with the internal electrical wiring of the door frame 80, where the wiring is supplied through on or both of the base portions or mounts 36*a*, 36*b* used to mount handle 20 to the frame 80. The power source may be low voltage DC or high voltage AC (120, 220V). In a further alternative, the electronic display 30 and controller 48 are supplied with power from a local power source in the display-equipped handle 20, such as a battery or some other form of local power. Still further, handle 20 may be powered via a solar power supply.

Figure 9A:
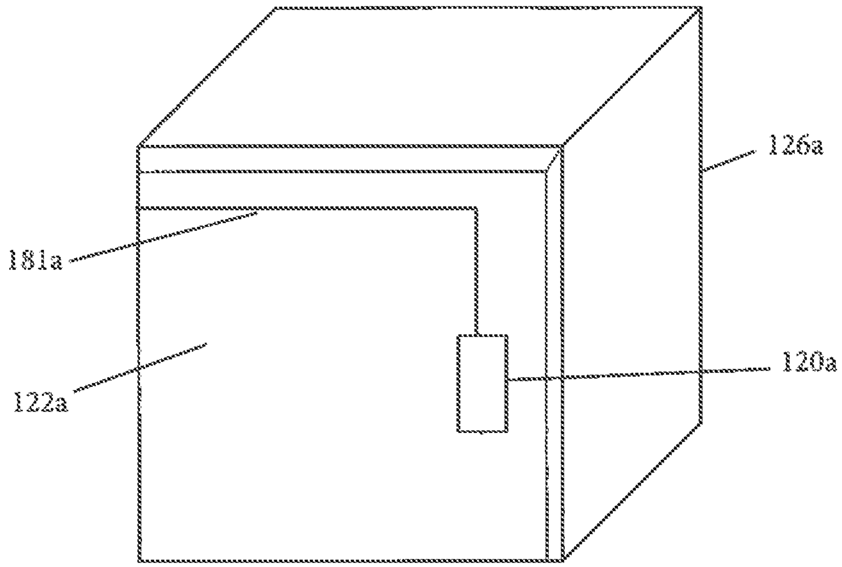
FIG. 9A is a schematic illustration of an embodiment of a graphical display device handle and appliance power supply configuration in accordance with the present invention.
Figure 9B:
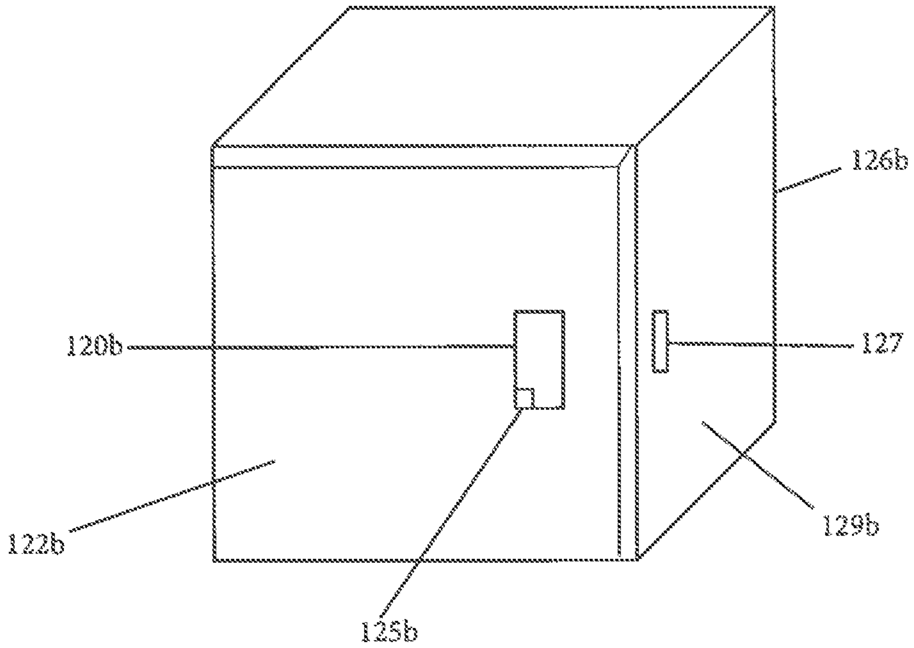
FIG. 9B is a schematic illustration of another embodiment of a graphical display device handle and appliance power supply configuration in accordance with the present invention.

For example, with reference to FIG. 9A, an appliance 126*a* is illustrated having a door 122*a* that does not include a frame and to which is mounted handle graphical display device 120*a*. An electrical tracing 181*a* is provided on door 122*a* to provide power to handle 120*a*. Still further, with reference to FIG. 9B, an appliance 126*b* is illustrated having a door 122*b* to which is mounted handle graphical display device 120*b*, where handle 120*b* includes a rechargeable battery 125*b* within the housing of the handle 120*b*. Appliance 126*b* further includes a charger 127*b* in the body 129*b* of the appliance 126*b*, where charger 127*b* may be an inductive charger that is located in proximity to handle 120*b* when door 122*b* is closed. In use, battery 125*b* may be used to provide power to handle 120*b* when door 122*b* is open, with charger 127*b* providing power and recharging battery 125*b* when door 122*b* is closed. Still further, an appliance may be constructed in which power is provided to a graphical display handle when the appliance door is closed, such as via an inductive power supply, but the display is off when the door is open.

Figure 1A:
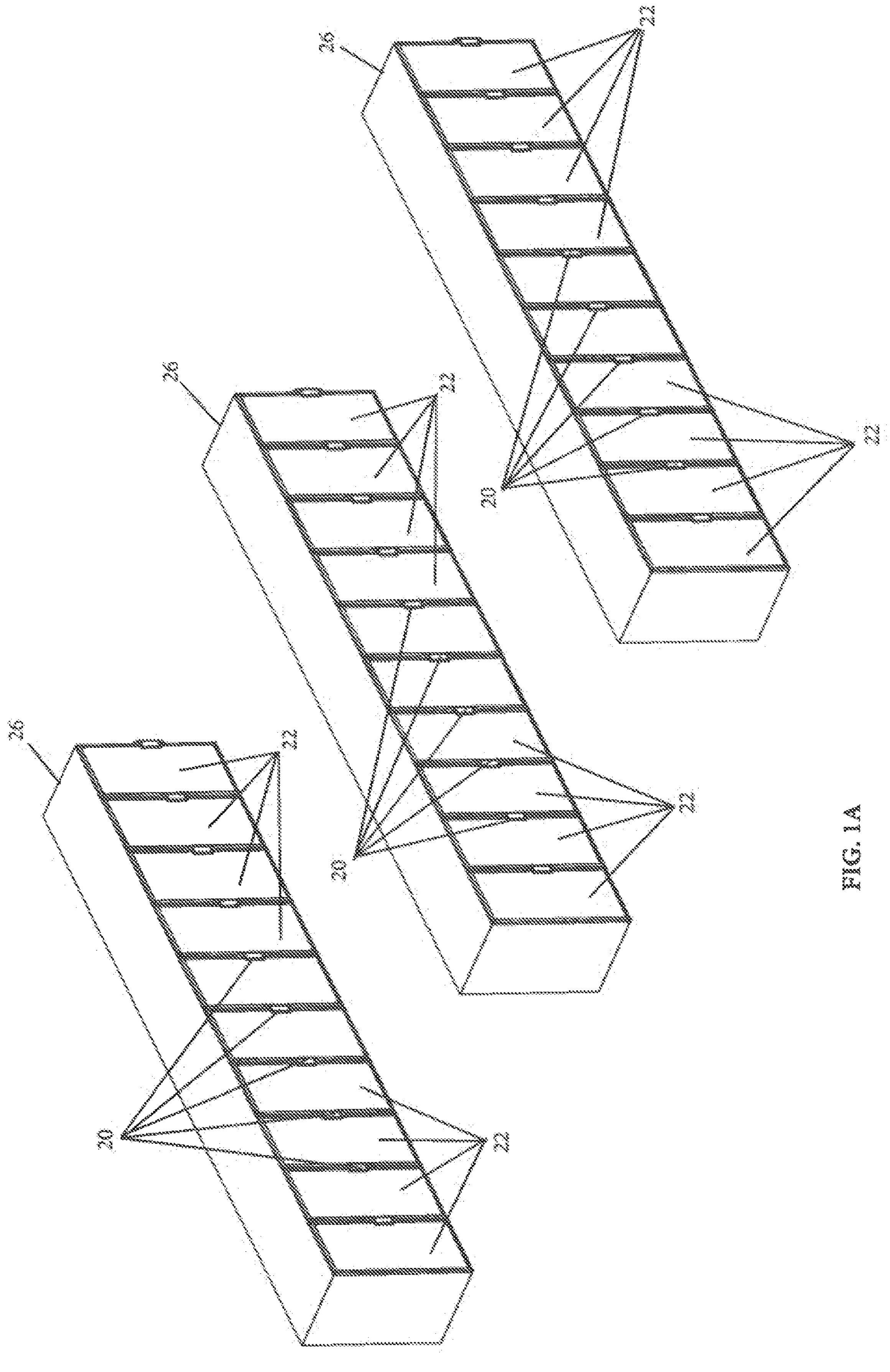
FIG. 1A is a perspective view of three coolers that each include multiple appliance doors with graphical display handles in accordance with aspects of the present invention.
Figure 2:
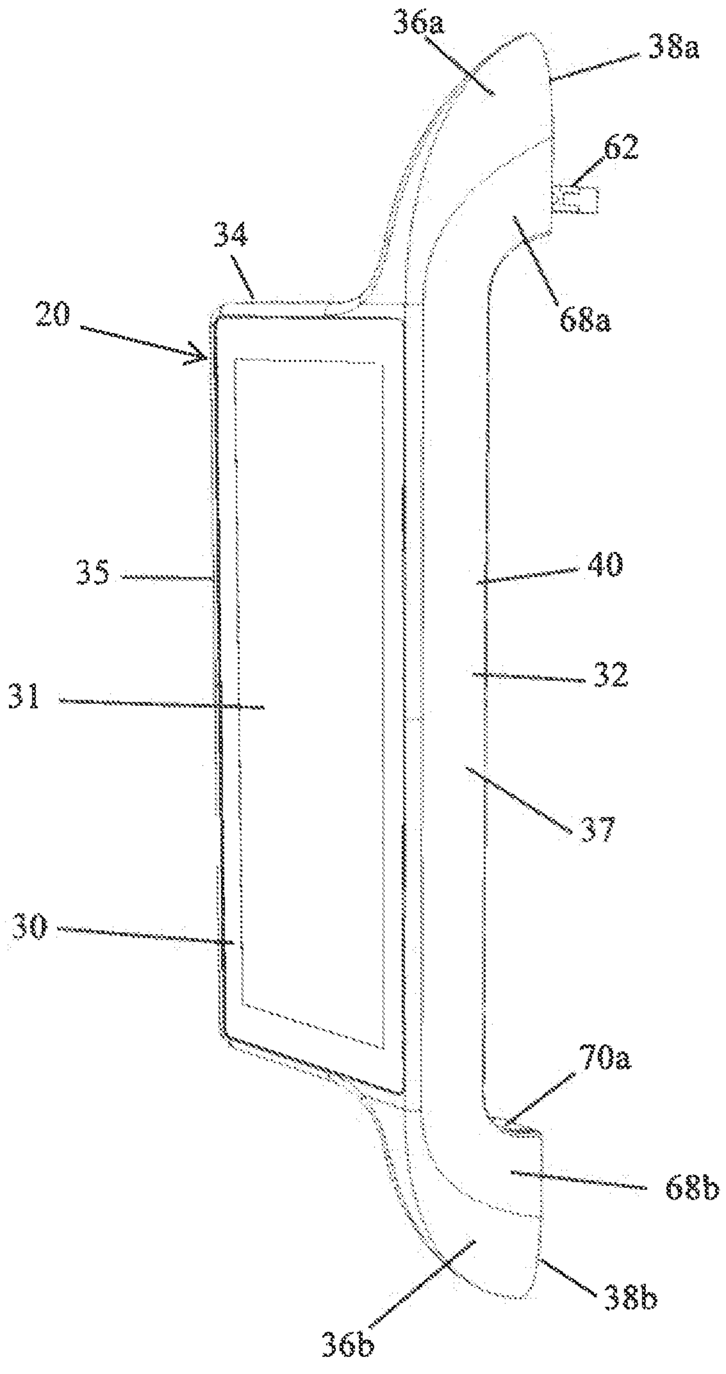
FIG. 2 is a front perspective view of the display handle of FIG. 1 removed from the appliance door.
Figure 3:
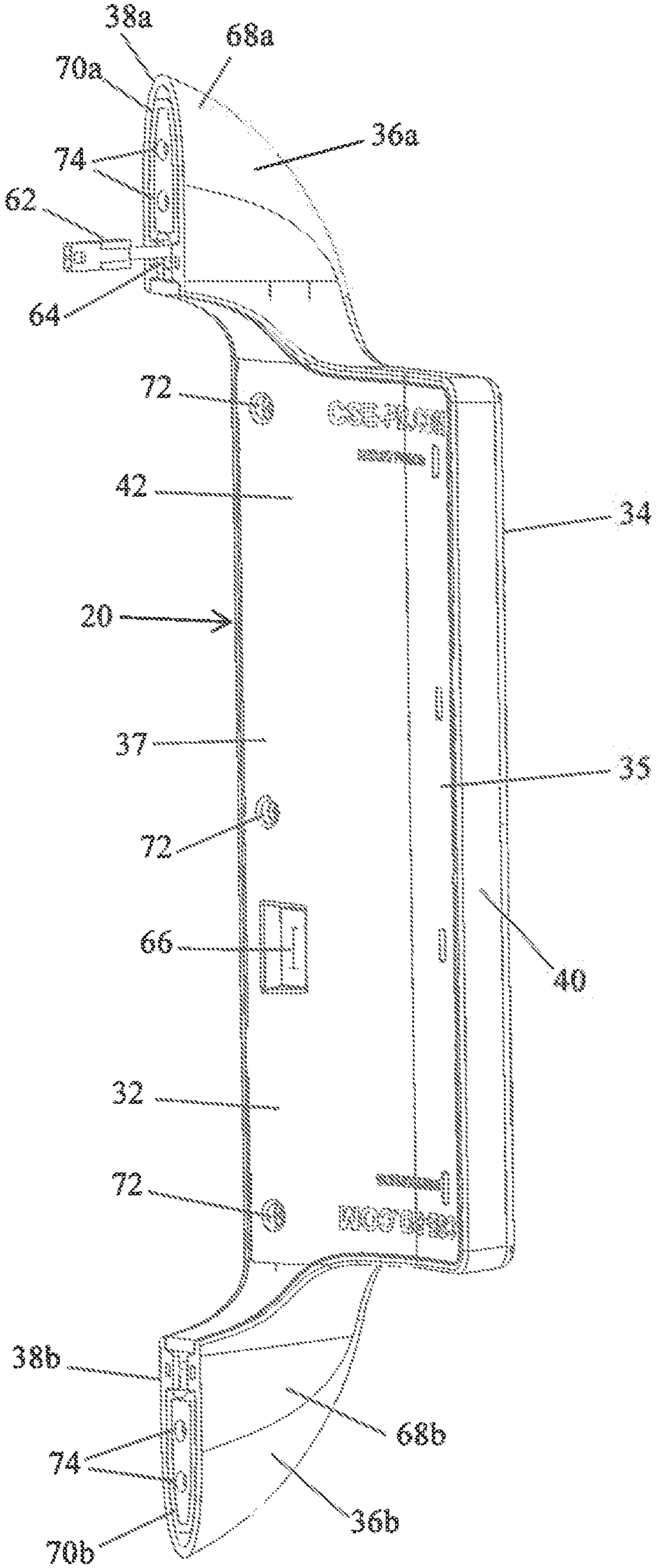
FIG. 3 is a rear perspective view of the display handle of FIG. 2.
Figure 4:
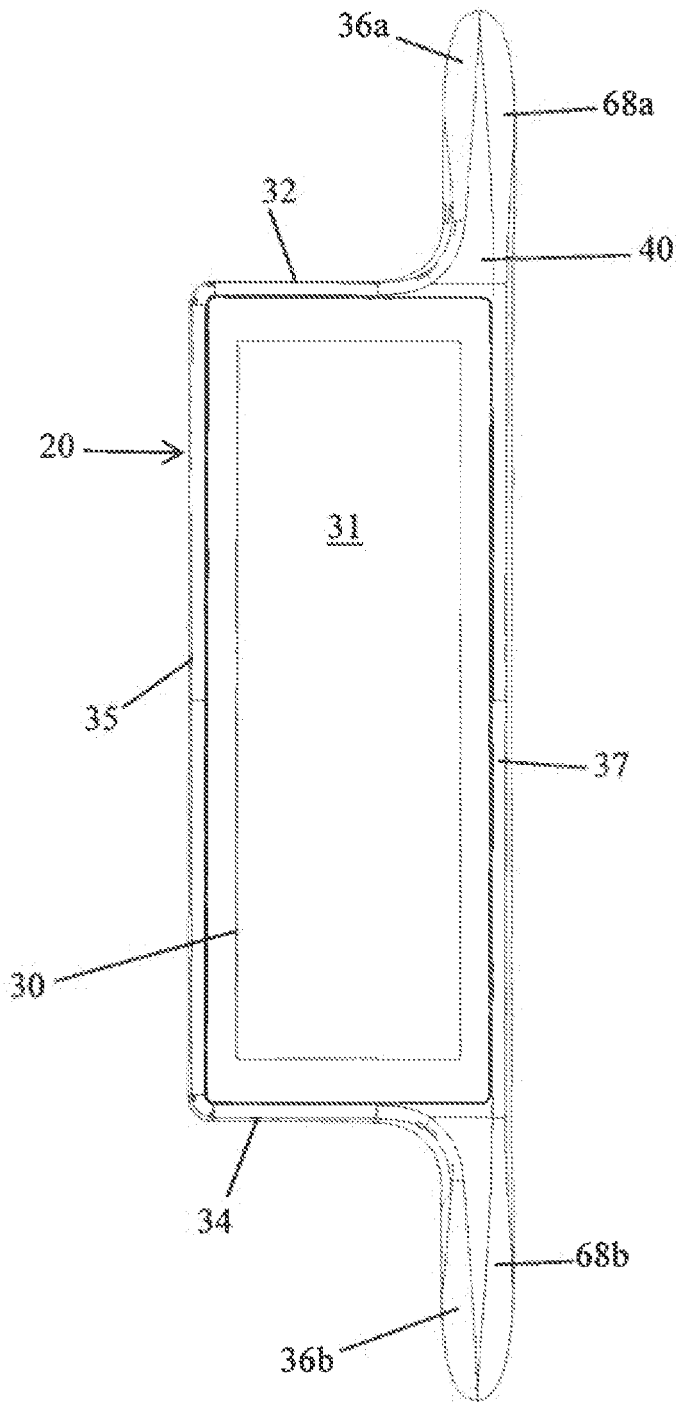
FIG. 4 is a front plan view of the display handle of FIG. 2.
Figure 5:
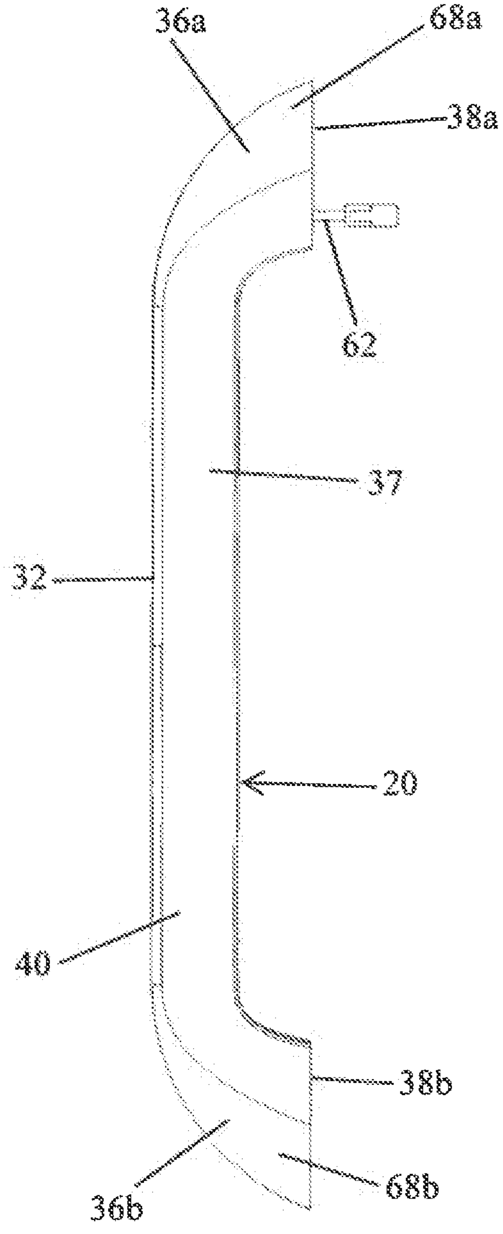
FIG. 5 is a side elevation view of the display handle of FIG. 2.
Figure 10A:
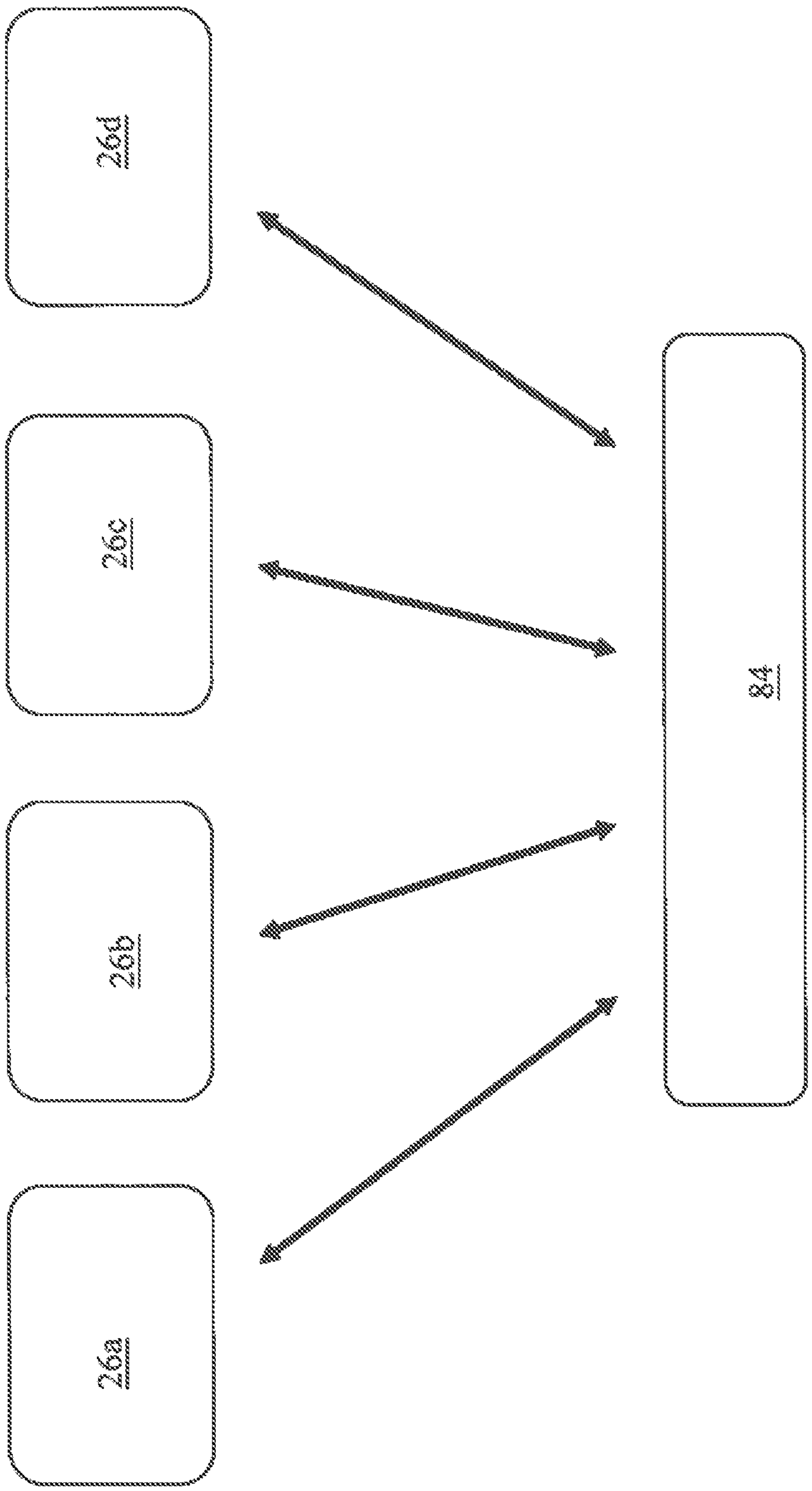
FIG. 10A is a schematic illustration of the interaction of a control system in accordance with present invention for use with coolers such as shown in FIG. 1A in a retail facility.

With reference to FIG. 10A, a control system is illustrated for controlling the displays 30 of multiple coolers 26, where each cooler includes multiple doors 22 that each include a handle 20, such as in FIG. 1A. The control system includes a computer device 84 that is communicatively coupled with four separate coolers 26*a*, 26*b*, 26*c* and 26*d*, as well as to each handle 20 on each of the individual coolers. The embodiment of FIG. 10A represents a single facility, such as a grocery store or retailer selling refrigerated or frozen goods. Each handle 20 has its own Internet Protocol (IP) address, or other form of identifier address, whereby the handles are networked. Computer device 84 thus enables a centralized control for providing display information to the displays 30 of the individual handles 20 on coolers 26*a*, 26*b*, 26*c* and 26*d*. For example, computer device 84 may be used to program the handles 20 and/or move files to selected handles 20. The programs may be used to loop through different displays, such as including pricing, product logos, or other product display information, including nutritional information. In the illustrated embodiment, controller 48 includes an operating system, such as Linux, Android, Mac, Windows IOT, to support software for controlling the display information on display screen 31. Although shown as a single computer device 84 it should be appreciated that control access to the handles 20 may be enabled or accessed through multiple separate computer devices 84, such as via a shared directory. It should be further appreciated that more than one or even all handles 20 may be simultaneously controlled to display particular information. For example, computer device 84 may include an application program that can configure multiple handles together or simultaneously. The group configuration tool may be used with regard to the display information on the display screens of the handles 20, as well as with regard to connecting to WiFi, grouping of different handles and/or coolers together, setting screen rotations for changing images on handles 20, as well as other such controllable features. Computer device 84 may be a computer resident in the facility, or may be a tablet or cell phone, including a device that is selectively brought into the facility for controlling the handles 22. Alternatively, a controller may be configured with a microprocessor with dedicated programs whereby the system does not require an operating system based platform. The graphics to be displayed may reside on either the controllers 48 of the handles 20 and/or the computer 84.

Figure 10B:
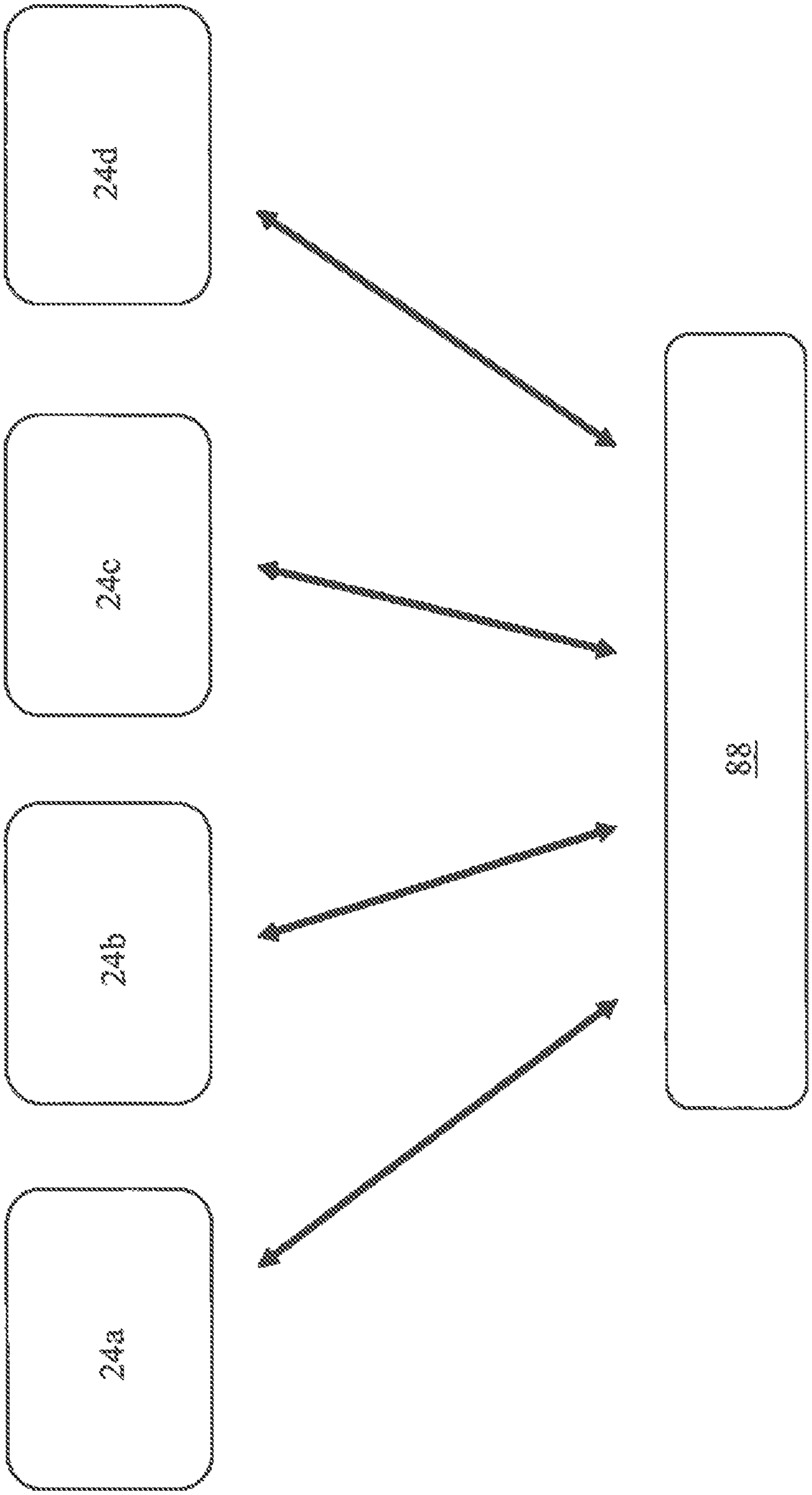
FIG. 10B is a schematic illustration of the interaction of a control system in accordance with present invention for use with multiple separate facilities having coolers such as shown in FIG. 1A.

With reference to FIG. 10B, a control system is illustrated for use in controlling the displayed information at multiple facilities or stores 24*a*, 24*b*, 24*c*, 24*d*, where each facility may include multiple coolers 26 that in turn each have multiple handles 20, where the control system of FIG. 10B includes a computer 88 that is networked with the various stores, such as via an Internet connection. In the embodiment of FIG. 10B, for example, the computer 88 may be retained at a central corporate location for control and monitoring of the displays 30 of the handles 20, including for updating and changing the displayed information on the displays 30. Again, although shown as a single computer 88, more than one computer may be configured for access for controlling the various facilities, coolers and handles, such as via a shared directory. The graphics to be displayed may reside on either the controllers 48 of the handles 20 and/or the computer 88. Alternatively, rather than being stores the facilities may be households, whereby information can be exchanged with households.

Figure 11:
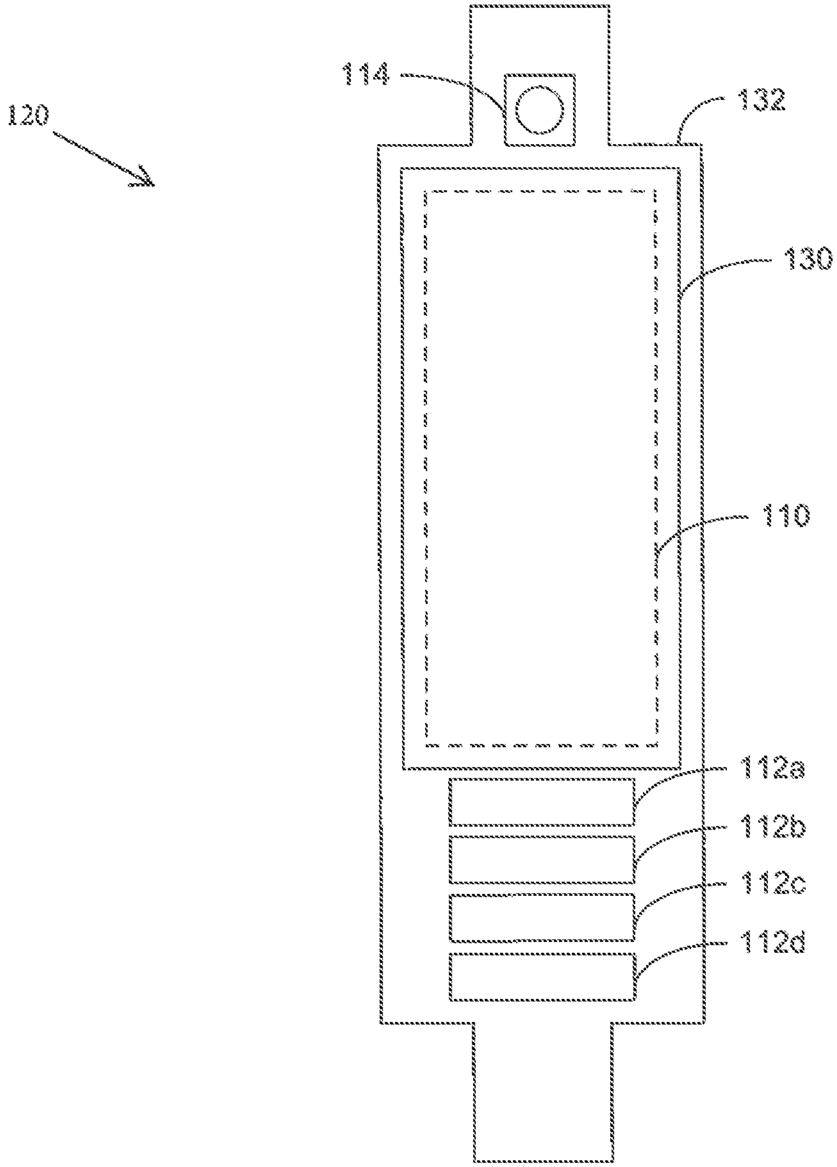
FIG. 11 is a front plan view of an alternative graphical display device handle in accordance with aspects of the present invention.

An alternative graphical display for appliances configured as a handle 120 is shown in FIG. 11, where handle 120 includes a graphical display 130 contained within a housing 132. Handle 120 is of similar construction to handle 20 discussed above, with 100 added to the corresponding reference numerals of handle 20. Due to the similarities of handle 120 with handle 20, not all of the similar components and features are discussed herein.

Handle 120 includes touch sensors 110, and other sensors 112 incorporated with housing 132. The touch sensor 110 may be one or more touch sensitive panels that cover at least a portion of the graphical display 130. Such touch sensors 110 may be incorporated into the graphical display 130 or be separate from it. Such touch sensors 130 provide for user/customer interaction with the display-equipped handle 120. Such interaction may include one or more of: user/customer information entry/retrieval, coupon entry/generation, user ID/password entry for secure functions, such as display adjustment, sale information, or the like, or for access to a locked door, such as for age or other similar restrictions. Such touch sensors 110 are exemplary in nature, other embodiments are also possible that provide for the desired user/customer interaction. The touch sensors 110 may be implemented as, for example, capacitive or resistive touch sensors.

Such other sensors 112 may include one or more of an occupancy/proximity sensor 112*a*, such as for sensing the approach or presence of a person, a bar code reader/scanner 112*b*, such as for reading presented bar codes, a motion sensor 112*c*, such as for sensing the motion of the handle/door or movement of product, and a RFID scanner or similar scanner 112*d*, such as for reading information from devices such as portable computing devices and/or cell phones, and for reading credit cards, and/or for providing payment processing technologies. Scanner 112*d* may also be used for inventory control, such as detecting the removal of products from a cooler in order to track inventory, such as to signal when to restock a particular product and/or to monitor the popularity of products. In such an embodiment the products may include a readable tag, such as an R/F tag, or other device whereby its removal can be sensed. The motion sensor 112*c* may be implemented as, but not limited to, accelerometers, gyroscopes, and IR/product sensors. Sensing the motion of the handle and/or door or product movement may be used to analyze activity, traffic, and buying patterns. While FIG. 11 illustrates an exemplary arrangement of the sensors 112*a-d*, the sensors 112*a-d* may be incorporated anywhere within the display-equipped handle 120.

FIG. 11 also illustrates a camera 114 incorporated into the housing 132 of the display-equipped handle 120. The camera 114 may be used for personal identification, such as facial recognition, for user/customer recognition, consumer profiling, such as by gender and age in order to provide targeted advertising display information, and for providing security, such as secure access to display functionality/control and/or for secure access to a locked door. The camera 114 may also be used to replace or supplement one or more of the other sensors 112*a-d* described above.

One or more sensors of a graphical display device, such as a sensor 112 of handle 120, may further be configured to detect the operation of an application software on the mobile phone of a user. This may be used, for example, to provide directed or targeted display information to a consumer, or may be used by a consumer to locate products within a facility, or in other manners to assist a consumer and/or provide targeted display information to a consumer, such as to display products that are offered for sale, including to offer specials to a consumer that is signed-up with a rewards program offered by a retailer.

Referring now to FIGS. 12-15, an alternative appliance graphical display device 220 is disclosed affixed to an appliance door, such as a cooler door 222, where graphical display device 220 is substantially similar to the handle graphical display device 20 discussed above, with 200 added to the corresponding reference numerals of handle 20. Due to the similarities of graphical display device 220 with handle graphical display device 20, not all of the similar components and features are discussed herein.

Figure 12:
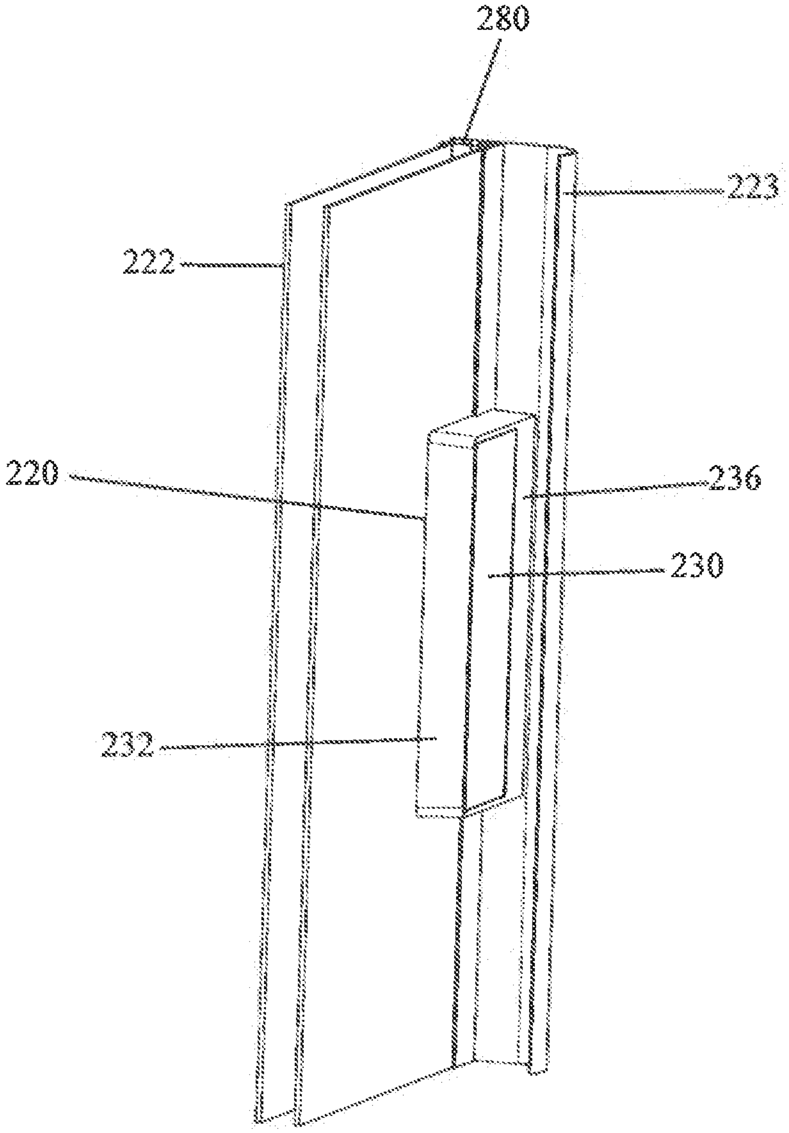
FIG. 12 is a front side perspective view of an alternative graphical display device in accordance with aspects of the present invention shown mounted to an appliance door.
Figure 13:
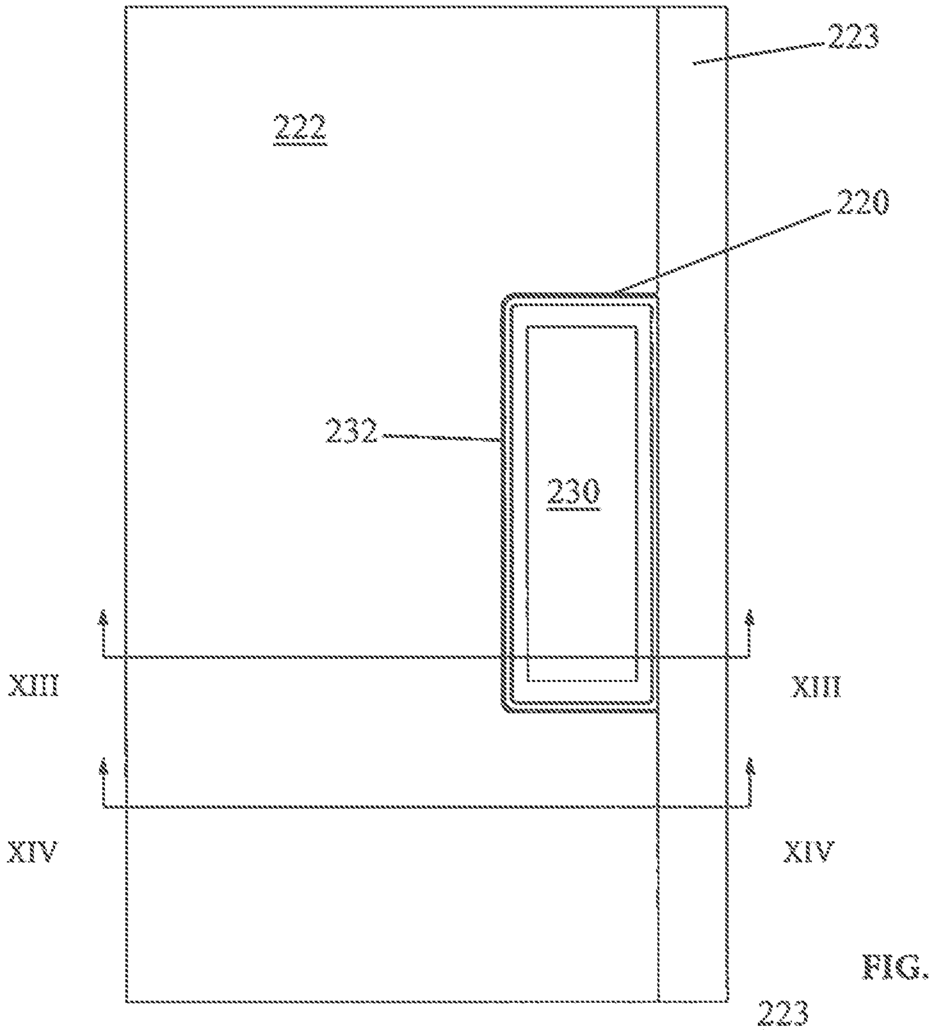
FIG. 13 is a front plan view of the graphical display device and appliance door of FIG. 12.
Figure 14:
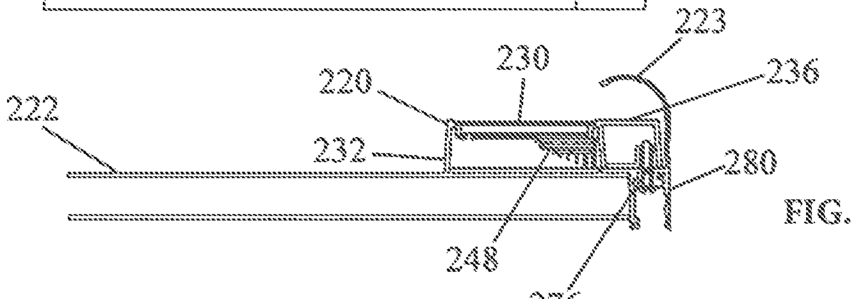
FIG. 14 is a cross-sectional view of the graphical display and appliance door of FIG. 12 taken along the line XIII-XIII of FIG. 13.
Figure 15:
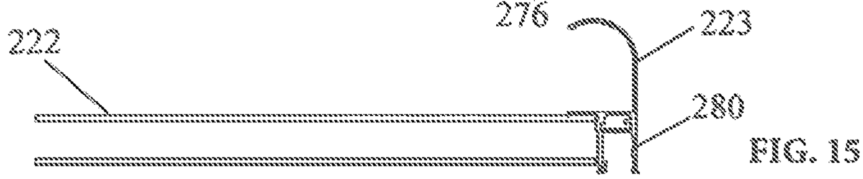
FIG. 15 is a cross-sectional view of the graphical display and appliance door of FIG. 12 taken along the line XIV-XIV of FIG. 13.

FIGS. 12 and 13 illustrate a partial cutaway of the cooler door 222, which includes an integrated generally c-shaped vertically extending grip channel 223 that is integrated with the frame 280 of the door 222. Graphical display device 220 is affixed to or with or adjacent the grip channel 223 whereby graphical display device 220 is integrated with the handle of the door 222. Graphical display device 220 includes a housing 232 that retains a display 230 and a controller 248. Display device 220 further includes an elongate mount 236 that is used to secure Graphical display device 220 to channel 223, such as via a fastener 276.

The graphical display-equipped door handles may be for new door construction or for retrofit to existing door systems. It should be further appreciated that alternative graphical display devices may be constructed and employed within the scope of the present invention. This includes, for example, graphical display devices that are mounted to transparent panels or frames of appliance doors separate and apart from being constructed or being intended to operate as a handle for the appliance door. For example, such an alternative graphical display device may be affixed to the transparent panel, such as via an adhesive or double-sided tape, with the graphical display device sized and configured such that products within the cooler are still visible through the transparent panel. The graphical display-equipped door handles may also be mounted in a vertical or horizontal orientation. Moreover, the appliance graphical display devices in accordance with the present invention may be used in retail facilities and/or households.

Figure 16:
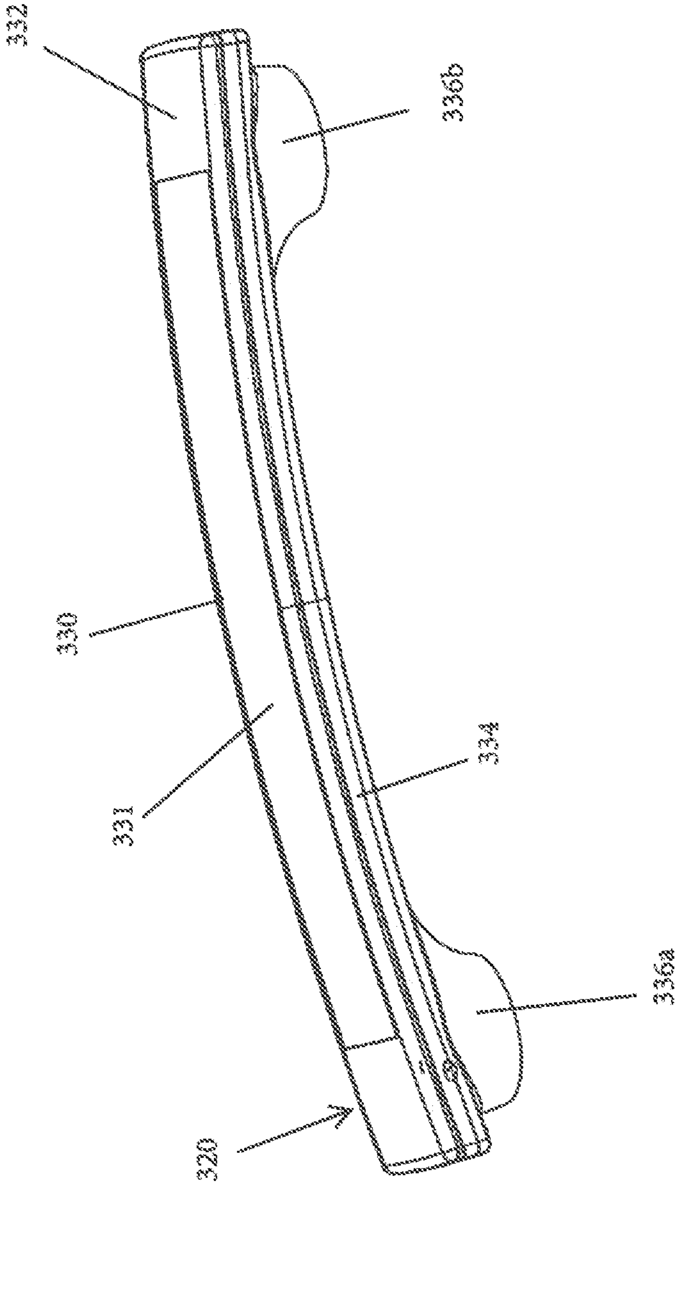
FIG. 16 is a side perspective view of another embodiment of an appliance door graphical display device handle in accordance with the present invention.

Still further, although handle 20 is shown to include two mounts 36*a*, 36*b*, alternative arrangements may be employed, including handles with one mount, such as along either a portion of or substantially the entire length of a handle, or more than two mounts, as well as alternatively shaped and sized handles. Similarly, alternative graphical display devices may have differing arrangements or locations for an inner cavity for retaining the controller therein, as well as different arrangements for a grip portion. Graphical display devices in accordance with the present invention may be provided with displays having touch screens, such as to swipe for brands or enter codes. An example of an alternatively configured handle graphical display device 320 is disclosed in FIG. 16 where handle 320 is substantially similar to the handle graphical display device 20 discussed above, with 300 added to the corresponding reference numerals of handle 20. Due to the similarities of graphical display device 320 with handle graphical display device 20, not all of the similar components and features are discussed herein. Handle 320, as shown, includes a housing 332 retaining a display 330 having a screen 331, where housing 332 includes a grip portion 334 and mounts 336*a*, 336*b* for affixing to an appliance door. Although not shown in FIG. 16, an internal controller is disposed within housing 332, such as in an internal cavity at or adjacent one of the mounts 336*a*, 336*b*.

In the illustrated embodiment housing 32 is constructed of plastic, such as with outer and inner portions 40, 42 being molded plastic. Alternative materials may, however, be employed, such as aluminum or steel. This includes, for example, an outer portion being plastic and an inner portion being constructed of aluminum or a carbon filled polymer for increased strength.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A graphical display system for a facility having a plurality of appliances with doors, said graphical display system comprising:

a plurality of graphical display devices, wherein individual ones of said graphical display devices are mounted to doors of said plurality of appliances within the facility such that at least some of said plurality of appliances have one of the selected said graphical display devices mounted to the doors thereof;

wherein each said plurality of graphical display device comprises a display screen, a housing to which the display screen is attached, and a controller and an interface at the housing, wherein the housing includes a mount for affixing the housing to a respective door, wherein the controller of each said plurality of graphical display device is operable to selectively enable visual display information to be displayed on the display screen of the respective said graphical display device;

a control system to which said graphical display devices are interfaced via the respective interfaces of said graphical display devices, wherein said control system comprises a computer separate from said graphical display devices and separate from the plurality of appliances;

wherein said computer is configured to control visual display information to be displayed on the display screen of the said plurality of graphical display devices; and wherein said plurality of graphical display devices are configured to be handles with the housings of said plurality of graphical display devices comprising a grip portion with said grip portion being spaced from the doors of said plurality of appliances when the mount is affixed to the door.

2. The graphical display system of claim 1, wherein the facility comprises a retail facility.

3. The graphical display system of claim 2, wherein the plurality of appliances comprise coolers.

4. The graphical display system of claim 1, wherein the doors comprise an outer surface defining a plane and wherein each of the handles are disposed at a peripheral edge of each of the doors and project outwardly beyond the plane of the doors when mounted thereto.

5. The graphical display system of claim 4, wherein the doors comprise a frame and wherein the mount of respective ones of said plurality of graphical display devices is affixed to the frame.

6. The graphical display system of claim 1, wherein the interfaces of said plurality of graphical display devices comprise wireless interfaces enabling wireless connection with said computer for controlling the visual display information to be displayed on the display screens.

7. The graphical display system of claim 1, wherein each said plurality of graphical display device further comprises a battery retained within the respective housing, and wherein the battery is configured to provide power to the controller and the display screen.

8. The graphical display system of claim 7, wherein the battery comprises a rechargeable battery and wherein the appliances each include a charger, and wherein the charger is operable to recharge the battery when the door is in a closed position.

9. The graphical display system of claim 8, wherein the chargers comprise inductive chargers.

10. The graphical display system of claim 1, wherein said computer is remote from the facility.

11. A graphical display system for a facility having a plurality of appliances with doors, said graphical display system comprising:

a plurality of graphical display devices, wherein individual ones of said graphical display devices are mounted to doors of said plurality of appliances within the facility such that at least some of said plurality of appliances have one of the selected said graphical display devices mounted to the doors thereof;

wherein each said plurality of graphical display device comprises a display screen, a housing to which the display screen is attached, and a controller and an interface at the housing, wherein the housing includes a mount for affixing the housing to a respective door, wherein the controller of each said plurality of graphical display device is operable to selectively enable visual display information to be displayed on the display screen of the respective said graphical display device;

a control system to which said graphical display devices are interfaced via the respective interfaces of said graphical display devices, wherein said control system comprises a computer separate from said graphical display devices and separate from the plurality of appliances;

wherein said computer is configured to control visual display information to be displayed on the display screen of the said plurality of graphical display devices;

wherein the doors comprise an outer surface defining a plan and wherein the doors each include a handle configured to be grasped by an individual to open the doors with the handle disposed at a peripheral edge of each of the doors and projecting outwardly beyond the plane of each of the doors, and wherein said plurality of graphical display devices are positioned outwardly from the outer surface of the doors when mounted thereto; and wherein the handles of the doors comprise a frame and wherein the mount of respective ones of said plurality of graphical display devices is affixed to the frame.

12. The graphical display system of claim 11, wherein the facility comprises a retail facility.

13. The graphical display system of claim 12, wherein the plurality of appliances comprise coolers.

14. The graphical display system of claim 11, wherein the interfaces of said plurality of graphical display devices comprise wireless interfaces enabling wireless connection with said computer for controlling the visual display information to be displayed on the display screens.

15. The graphical display system of claim 11, wherein each said plurality of graphical display device further comprises a battery retained within the respective housing, and wherein the battery is configured to provide power to the controller and the display screen.

16. The graphical display system of claim 15, wherein the battery comprises a rechargeable battery and wherein the appliances each include a charger, and wherein the charger is operable to recharge the battery when the door is in a closed position.

17. The graphical display system of claim 16, wherein the chargers comprise inductive chargers.

18. The graphical display system of claim 11, wherein said computer is remote from the facility.

* * * * *